(12) United States Patent
Henderson et al.

(10) Patent No.: US 7,929,484 B2
(45) Date of Patent: Apr. 19, 2011

(54) WIRELESS COMMUNICATION NETWORK PROVIDING MULTI-HOP COMMUNICATIONS

(75) Inventors: Gregory Newell Henderson, Sudbury, MA (US); Thomas Andrew Hengeveld, Hollis, NH (US); Daniel Wayne Ericson, Hollis, NH (US); Dennis Michael Martinez, Westford, MA (US); Reid Henry Johnson, Manchester, NH (US)

(73) Assignee: Pine Valley Investments, Inc., Las Vegas, NV (US)

( * ) Notice: Subject to any disclaimer, the term of this patent is extended or adjusted under 35 U.S.C. 154(b) by 453 days.

(21) Appl. No.: 11/058,891

(22) Filed: Feb. 16, 2005

(65) Prior Publication Data
US 2006/0099954 A1      May 11, 2006

Related U.S. Application Data

(63) Continuation-in-part of application No. 10/985,589, filed on Nov. 11, 2004, now Pat. No. 7,916,684.

(51) Int. Cl.
*H04W 4/00* (2009.01)
(52) U.S. Cl. ........................ 370/328; 370/338
(58) Field of Classification Search ............ 370/328, 370/338, 331; 455/41.2, 561
See application file for complete search history.

(56) References Cited

U.S. PATENT DOCUMENTS

| | | | |
|---|---|---|---|
| 5,479,400 A | 12/1995 | Dilworth et al. | 370/60 |
| 6,560,443 B1 * | 5/2003 | Vaisanen et al. | 455/73 |
| 6,654,616 B1 | 11/2003 | Pope, Jr. et al. | 455/556 |
| 6,687,503 B1 | 2/2004 | Porter et al. | 455/452.1 |
| 6,728,514 B2 | 4/2004 | Bandeira et al. | 455/13.1 |
| H2106 H | 7/2004 | Bilgic et al. | 370/281 |
| 6,816,706 B1 | 11/2004 | Hohnstein et al. | 455/25 |
| 6,847,625 B2 | 1/2005 | Heinonen et al. | 370/338 |
| 6,891,821 B2 | 5/2005 | Krishnakumar et al. | 370/343 |
| 7,039,358 B1 * | 5/2006 | Shellhammer et al. | 455/41.2 |
| 2002/0058513 A1 * | 5/2002 | Klein et al. | 455/447 |
| 2002/0072329 A1 | 6/2002 | Bandeira et al. | 455/7 |
| 2003/0108016 A1 | 6/2003 | Bonta | 370/338 |
| 2003/0194995 A1 | 10/2003 | Handerson et al. | |
| 2003/0235175 A1 | 12/2003 | Naghian et al. | 370/338 |
| 2004/0014442 A1 | 1/2004 | Okanobu | 455/130 |
| 2004/0062214 A1 | 4/2004 | Schnack et al. | 370/315 |
| 2004/0162115 A1 | 8/2004 | Smith et al. | |
| 2004/0174839 A1 * | 9/2004 | Lopes | 370/328 |
| 2004/0213218 A1 * | 10/2004 | Dougherty et al. | 370/386 |
| 2004/0253984 A1 * | 12/2004 | Csapo et al. | 455/561 |
| 2005/0030968 A1 | 2/2005 | Rich et al. | 370/449 |

(Continued)

FOREIGN PATENT DOCUMENTS

EP       1 292 073    *    3/2003

(Continued)

*Primary Examiner* — George Eng
*Assistant Examiner* — Michael Faragalla
(74) *Attorney, Agent, or Firm* — Allen, Dyer, Doppelt Milbrath & Gilchrist, P.A.

(57) ABSTRACT

A wireless communication network is provided that includes a plurality of communication cells each defined by at least one communication coverage area and a plurality of access points each corresponding to a different one of the plurality of communication cells. Each access point is configured to communicate on a first frequency with at least one of (i) a subscriber in the at least one communication coverage area in a first communication cell and (ii) a subscriber in a second communication cell. Each access point is further configured to communicate on a second frequency with an access point in a third communication cell.

11 Claims, 5 Drawing Sheets

U.S. PATENT DOCUMENTS

2005/0036470 A1    2/2005   Calvert .................. 370/338

FOREIGN PATENT DOCUMENTS

| EP | 1 406 416 A1 | 4/2004 |
| EP | 1 448 011 A1 | 8/2004 |
| WO | WO 97/38509 | 10/1997 |
| WO | WO 02/078369 | 10/2002 |

* cited by examiner

WIRELESS COMMUNICATION NETWORK PROVIDING MULTI-HOP COMMUNICATIONS

CROSS REFERENCE TO RELATED APPLICATIONS

This application is a continuation-in-part of and claims priority to non-provisional U.S. Patent application entitled "WIRELESS COMMUNICATION NETWORK," assigned Ser. No. 10/985,589, and filed Nov. 11, 2004 now U.S. Pat. No. 7,916,684, which is hereby incorporated by reference in its entirety.

BACKGROUND OF THE INVENTION

This invention relates generally to wireless networks, and more particularly, to a wireless network for communicating using multiple access points.

The use of broadband wireless networks (e.g., 802.11 WLAN) has increased due to these networks providing high-speed network access (e.g., communication speeds greater than 1 Mbps) in a wireless environment. Users of these wireless networks can move to different locations in a coverage area and maintain network connectivity. These networks are typically configured having wireless access points, sometimes referred to as hot-spots, that each provide a wireless communication range of typically about 100 meters. These wireless access points are connected to a wired network using, for example, a high-speed network connection such as fiber optics, T-1, DSL, cable modem, etc. The communication path in these wireless networks is typically from (i) a mobile user to an access point (AP) across the wireless link and (ii) from the AP to the network (e.g., wide area network (WAN)) using a wired connection. Thus, a mobile device (e.g., laptop computer) communicates with the network via one or more wireless access points. However, because of the limited range for communicating with an access point (e.g., about 100 meters), many access points are required to cover a large communication area. This then requires many high speed wired network connections, often referred to as a backhaul, for each access point. The increased number of wired connections increases the cost and complexity of such wireless networks, and sometime does not provide a practical implementation.

Networks have been developed having a mesh configuration to address the backhaul issue. In this mesh configuration, each of the access points and/or nodes in the network can communicate information between adjacent or neighboring access points and/or nodes, thus providing a form of wireless backhaul for the network. In this mesh network, a message from a mobile user can "hop" from one access point to another access point until it reaches a wired backhaul connection. Thus, a network with fewer wired access points may be implemented. However, in such a network, the effective throughput of the network is substantially reduced as the user's message travels over multiple "hops" to get to the wired backhaul. More particularly, when using a mesh routing protocol the effective network data rate drops rapidly as the number of hops increases. The decrease in throughput results from a lack of frequency planning and channel allocation to separate the bandwidth of the AP-mobile messages and the backhaul messages between access points that carry the message back to the wired network. In general, each access point has a single radio that is used to communicate with both the mobile users and the other access points in the network. The lack of available bandwidth for backhaul and frequency planning greatly limits the scalability of this mesh network architecture. As the mesh network is implemented over larger areas, a larger percentage of the total capacity (e.g., backhaul/mobile capacity) is used to transmit updates to the network routing status.

Thus, known wireless communication systems having different configurations may be complex to implement, have reduced throughput, and provide limited scalability.

BRIEF DESCRIPTION OF THE INVENTION

According to an exemplary embodiment, a wireless communication network is provided that includes a plurality of communication cells each defined by at least one communication coverage area and a plurality of access points each corresponding to a different one of the plurality of communication cells. Each access point is configured to communicate on a first frequency with at least one of (i) a subscriber in the at least one communication coverage area in a first communication cell and (ii) a subscriber in a second communication cell. Each access point is further configured to communicate on a second frequency with an access point in a third communication cell.

According to another exemplary embodiment, a wireless network architecture is provided that includes a plurality of communication cells each including at least one communication coverage area for communicating with a subscriber within the at least one communication coverage area. The wireless network architecture further includes a plurality of access points each corresponding to a different one of the plurality of communication cells. Each of the plurality of access points is configured to operate at a first frequency in a set of frequencies for communicating at least with one of (i) the subscriber within the at least one communication coverage area within the communication cell and (ii) a first access point in another communication cell. Each of the access points are further configured to operate at a second frequency in the set of frequencies and distinct from the first frequency for communicating with a second access point in another communication cell different than the communication cell having the first access point.

According to yet another exemplary embodiment, a method for wirelessly communicating in a network is provided. The method includes providing a plurality of communication cells each defined by at least one communication coverage area. The method further includes configuring a plurality of access points corresponding to the plurality of communication cells to communicate on a first frequency with at least one of (i) a subscriber in the at least one communication coverage area and (ii) an access point in a first different communication cell. The method also includes configuring the plurality of access points to communicate on a second frequency with another access point in a second different communication cell, with the communication provided by time division duplexing.

DETAILED DESCRIPTION OF THE INVENTION

Figure 1:
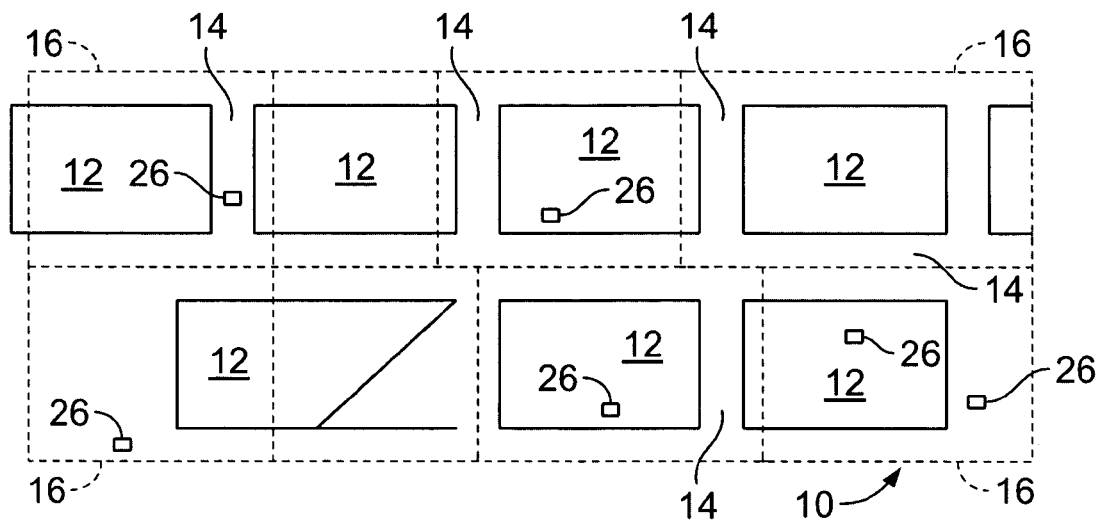
FIG. 1 is a block diagram illustrating a wireless coverage area in accordance with various embodiments of the invention.

Various embodiments of the present invention provide a wireless network architecture allowing one or more wireless devices to communicate over and/or with a network over different regions within a wireless network coverage area. For example, and as shown in FIG. 1 a wireless coverage area 10 may generally cover an area defined by a geographic region, such as, for example, a plurality of blocks 12 within a city or town. Each of the blocks may be separated by a street 14 and each of blocks may include, for example, one or more buildings (not shown), an open area or field, a park, etc. The wireless coverage area 10 may include and be defined by, for example, one or more wireless local access areas 16 (e.g., WiFi hot-spots). The local access areas 16 may cover more or less than a block in the geographic region, for example, based on system or communication requirements, and/or based on the size of the blocks.

One or more mobile devices 26 (e.g., laptop computer or personal digital assistant (PDA)) having wireless communication capabilities (e.g., an installed wireless communication card) may be located with these different local access areas 16 (e.g., on a street 14 or in a building) and/or may be moving between these local access areas 16. Thus, a mobile device 26 may move through the wireless coverage area 10 and maintain connection and communication with a network using the wireless local access areas 16.

Figure 2:
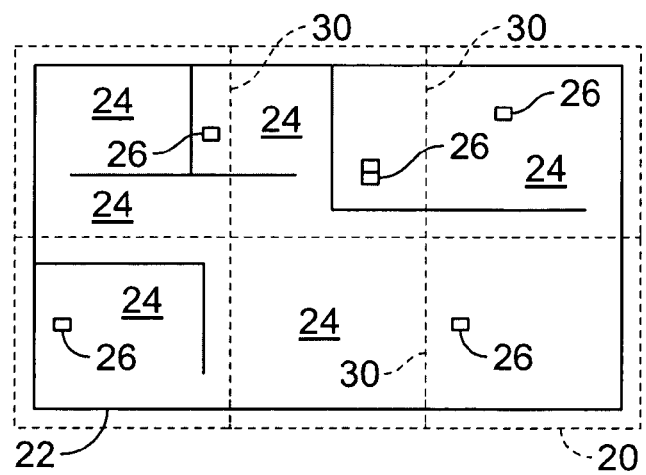
FIG. 2 is a block diagram illustrating another wireless coverage area in accordance with various embodiments of the invention.

As another example, a wireless coverage area 20 may generally cover an area defined by a physical structure 22 (e.g., a building), as shown in FIG. 2. The wireless coverage area 20 may include and be defined by, for example, one or more wireless local access areas 30 (e.g., WiFi hot-spots). The total area covered by the wireless coverage area 20 may be larger or smaller than the structure 22, for example, based on system or communication requirements.

Within the structure 22, different areas 24 (e.g., different rooms) may be provided. One or more mobile devices 26 (e.g., laptop computer or personal digital assistant (PDA)) having wireless communication capabilities (e.g., an installed wireless communication card) may be located with these different areas 24 and/or may be moving between these different areas 24. It should be noted that each area 24 may be covered by one or more wireless local access areas 30 to allow wireless communication with the network. Thus, a mobile device 26 may move through the coverage area 20 and maintain connection and communication with a network using the wireless local access areas 30.

Figure 3:
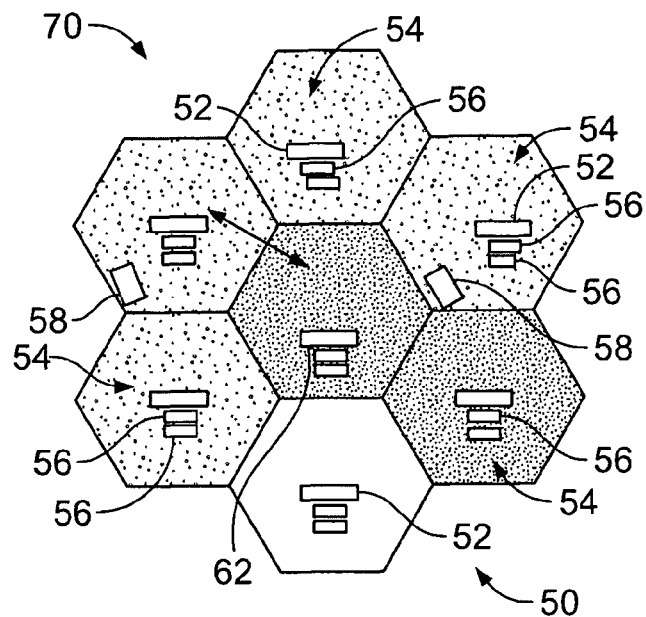
FIG. 3 is a block diagram of a wireless network architecture including a communication cell in accordance with various embodiments of the invention.

More specifically, and in an exemplary embodiment as shown in FIG. 3, a wireless network architecture 50 is provided that uses a wireless channel (e.g., broadband wireless links) to provide communication from local access points 52 to mobile devices 58 and a backhaul communication system, while ensuring available (e.g., guaranteed) bandwidth for both. Additionally, and as described in more detail herein, the wireless network architecture 50 provides micro and macro-frequency planning that allows the network to be scaled to cover large areas with minimal or no loss in throughput. It should be noted that although different reference numbers may be used in the different figures, the components therein, such as, for example, the access points, coverage areas, mobile devices, etc. may be the same and/or may be different as desired or needed, such as, based on system or application requirements.

The wireless network architecture 50 is defined by a plurality of local access points 52 each providing a defined wireless access coverage area 54. For example, and referring to FIG. 2, the wireless local access areas 30 may be provided by the local access points 52 that define wireless access coverage areas 54, each of which may encompass a local access area 30, or more or less than a single local access area 30. Each local access point 52 may include one or more communication devices, for example, radios 56 to provide communication between a mobile device 58 (e.g., laptop computer with installed wireless communication card) within the associated wireless access coverage area 54 and the network. The radios 56 may be configured as desired or needed, and as is known, to provide wireless communication. For example, the radios 56 each may include a transceiver, an antenna and a router for communicating with at least one of (i) the mobile device(s) 58 within the wireless access coverage area 54 covered by the particular radio 56, (ii) a radio in an adjacent wireless access coverage area 54 and (iii) the network via a wired connection (e.g., a wired LAN).

Figure 5:
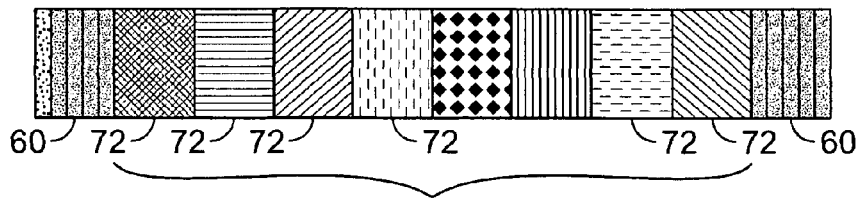
FIG. 5 is a block diagram illustrating a communication frequency configuration in accordance with various embodiments of the invention.

In operation, and in an exemplary embodiment, the mobile devices 58 communicate with the local access points 52 using one of a set of frequencies or channels, for example, as shown in FIG. 5, using one of ten 1 MHz channels 60 in the 4.9 GHz public safety spectrum. However, it should be noted that the frequency range may be modified as desired or needed. For example, the radios 56 may be configured using the IEEE 802.11 communication standard to provide wireless communication, such as 802.11b, often referred to as WiFi. As another example, the radios may be configured using the IEEE 802.16 communication standard to provide wireless communication, often referred to as WiMAX. It should be noted that in the various embodiments, multiple access points may use the same frequency, in which case, methods to avoid self interference are implemented, such as, for example, spatial and/or time diversity.

The number of frequencies may be selected, for example, to allow for a tessellated frequency plan and frequency reuse model for the mobile devices 58 to communicate with the local access points 52. In this embodiment, one access point is configured as the master access point 62 for wirelessly communicating with the local access points 52 and with the network via a wired connection. For example, in the embodiment shown in FIG. 2, the middle access point within the tessellated arrangement may be configured as the master access point 62.

The local access points 52 are configured to communicate with the master access point 62 using a set of frequencies or channels. For example, in an exemplary embodiment, the master access point 62 communicates with each of the local access points 52 associated therewith using a single channel (e.g., single frequency) from a set of eight 5 MHz channels in the 4.9 GHz public safety spectrum. However, it again should be noted that the frequency range may be modified as desired or needed.

It should be noted that the wireless access coverage areas 54 of the local access points 52 and master access point 62 define a wireless communication cell 70 (e.g., defined by the seven wireless access coverage areas 54 shown in FIG. 3). Within the wireless communication cell 70, and for example, each of the access points (both the local access points 52 and the master access point 62) provide communication with mobile devices 58 using a set of frequencies, that in one embodiment provide communication rates up to about 2 Mbps. Further, each of the local access points 52 provide communication with the master access point 62 using a single frequency that in one embodiment provides communication rates up to about 10 Mbps.

Figure 4:
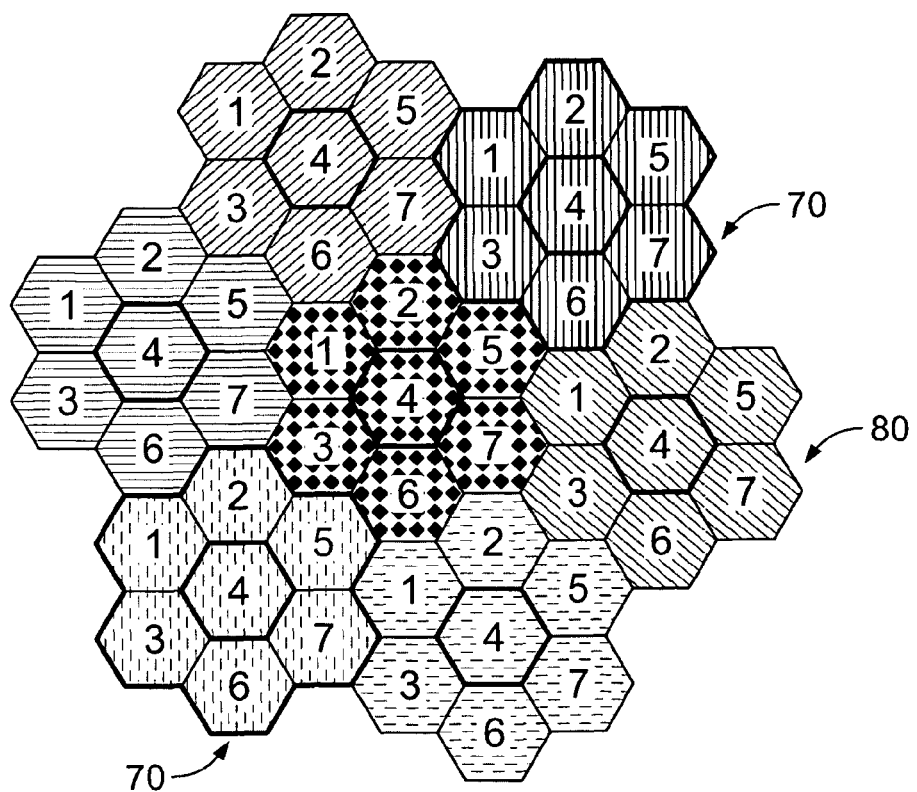
FIG. 4 is a block diagram of a backhaul macro-communication cell network including a plurality of communication cells as shown in FIG. 2 in accordance with various embodiments of the invention.

In various embodiments, all of the local access points 52 in one communication cell 70 use a single backhaul frequency that may form an element of a backhaul macro-communication cell 80 as shown in FIG. 4. Thus, a plurality of communication cells 70 (e.g., seven shown in FIG. 4) together form a backhaul macro-communication cell 80, which in one embodiment is also configured using a tessellated frequency plan to provide a large-scale frequency reuse to the backhaul network.

In an exemplary embodiment, each of the communication cells 70 includes a master access point 62 configured as the backhaul access point, for example access point "4" that communicates with the network via a wired backhaul connection (e.g., wired connection to a network). It should be noted that communication within each of the communication cells 70, and in particular, from the local access points 52 to the backhaul access point (e.g., master access point 62) may be provided using seven of the eight 5 MHz channels 72 in the 4.9 GHz public safety spectrum as shown in FIG. 5. For example, communication may be provided from 4.94 GHz to 4.99 GHz, with ten 1 MHz frequency channels (five at each end of the frequency range) for local access point 52 to mobile 58 communication and eight 5 MHz frequency channels for local access point 52 to master access point 62 communication. In an exemplary embodiment, and referring again to FIG. 4, seven of the ten 1 MHz frequency channels and seven of the eight 5 MHz frequency channels may be used to provide communication. However, only one (or less than seven) of each of the 1 MHz frequency channels and the 5 MHz frequency channels may be used, in which case, methods to avoid self interference are implemented, such as, for example, spatial and/or time diversity. It should again be noted that the frequency range may be modified as desired or needed.

The various embodiments allow the local access points 52 to reduce or eliminate self-interference in the backhaul network. In these various embodiments, the backhaul macro-communication cell 80 provides that the bandwidth of the backhaul link can be configured to exceed the bandwidth of the mobile device 58 to access point 52 link, which allows the network to provide quality-of-service (QoS) guarantees from, for example, a WAN to a mobile client.

Thus, in various embodiments, a wireless communication architecture is provided wherein a plurality of local access points 52 wirelessly communicate with mobile devices 58 using a different frequency in each wireless access coverage area 54 associated with the corresponding local access point 52 (e.g., a plurality of local communication channels) and communicate with a master access point 62 or backhaul access point wirelessly using a single frequency (e.g., a master communication channel) different than the frequencies used within each of the wireless access coverage areas 54. In an exemplary embodiment, the local access points 52 include two radios 56, one radio configured to provide communication between the local access point 52 and the mobile devices 58 (e.g., laptop computer with installed wireless communication card) within the wireless access coverage areas 54 and one radio configured to provide communication between the local access point 52 and the master access point 62. Thus, each of the first radios 56 corresponding to the local access point 52 within each of the wireless access coverage areas 54 are configured to communicate with mobile devices 58 using a first set of frequencies (e.g., the same or different frequencies within the set of frequencies) and each of the second radios 56 are configured to communicate with the master access point 62 using a single frequency that is different than any of the first set of frequencies of the first radios 56. It should be noted that the first and second radios 56 may be separate physical radios or may be a single radio with multiple transceivers.

Figure 6:
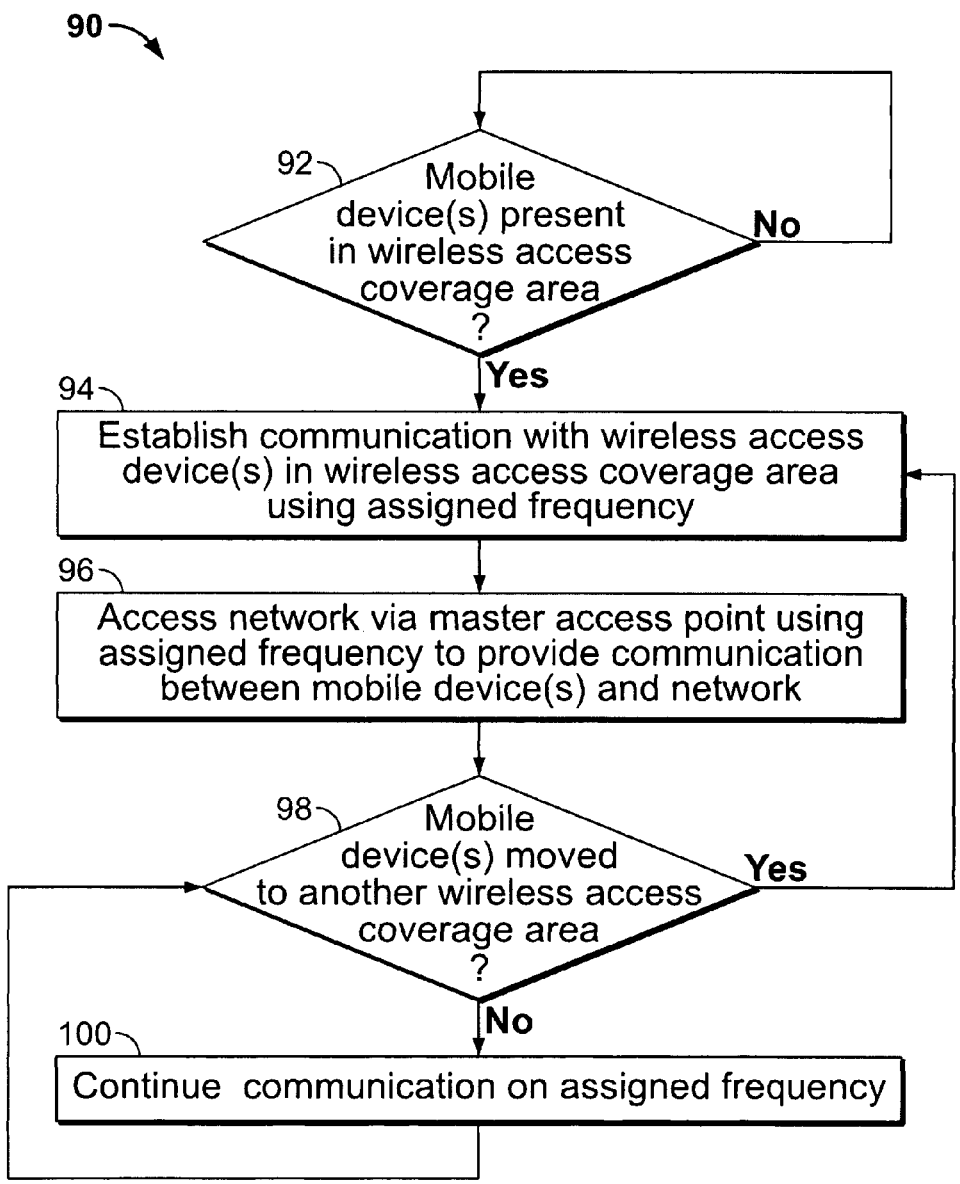
FIG. 6 is a flowchart of a method for communicating within a communication cell in accordance with various embodiments of the invention.

In an exemplary embodiment, communication is provided within the wireless communication cell 70 and the backhaul macro-communication cell 80 as shown in flowchart 90 in FIG. 6. Specifically, at 92, a determination is made as to whether any mobile devices 58 (shown in FIG. 2) are present in a wireless access coverage area 54 (shown in FIG. 2). For example, a determination may be made, as is known, as to whether a laptop computer is attempting to access the network in a recognized hot-spot. If a mobile device 58 is present, then at 94, wireless communication is established with the mobile device 58 via the local access point 52 in that wireless access coverage area 54 using the assigned frequency, for example, using a first radio 56 as described herein. It should be noted that access may be provided to only authorized mobile devices 58 (e.g., a secure connection) or may be provided to any mobile devices 58 (e.g., non-secure connection). Thereafter, at 96, access to the network, for example, to download information from the Internet or access an email account, is provided via the master access point 62 (shown in FIG. 2) using the assigned frequency, such as, using a second radio 56 as described herein. Thus, communication is provided from the mobile device 58 to the network, via the local access point 52 and master access point 62 using different frequencies as described herein. It should be noted that the assigned frequencies may be selected as desired or needed, for example, based on the communication application.

At 98 a determination is made as to whether the mobile device 58 has moved to another wireless access coverage area 54, for example, by determining whether the mobile device 58 is still accessing the local access point 52. If not, then communication is maintained on the assigned frequency at 100. If the mobile device 58 has moved to an area covered by another local access point 52, then communication is established at 94 within a different wireless access coverage area 54 corresponding to the new local access point 52. It should be noted that the mobile device 58 may move between different communication cells 70 with the same process described above implemented in each communication cell 70.

Thus, the available bandwidth is dedicated as separate mobile frequencies and backhaul frequencies, wherein the mobile frequencies are tessellated to allow network scalability as shown in FIG. 3. Using this tessellated frequency arrangement, a macro-frequency plan for backhaul communication may be provided. It should be noted that although a frequency reuse pattern of seven is shown (i.e., seven local access points 52 in each communication cell 70), other reuse patterns such as 3, 4, 14, etc. can be used. Further, although each of the master access points 62, which may define a backhaul access point, are described having a wired backhaul connection, variations may be provided, such as, for example, having alternating wired and wireless connections. Additionally, different sub-cells other than "4" in each of or all of the communication cells 70 may be configured as the backhaul access point. Also, although the sub-cells or wireless access coverage areas 54 are shown as hexagons, different configurations may be provided, for example rectangles or squares. Also, the communication channels may be modified such that the transition is different than 1 MHz channels for local access point 52 to mobile device 58 communication and 5 Mhz channels for local access point 52 to master access point 62 communication.

Further, different wireless network architectures may be provided in accordance with various embodiments of the invention. For example, instead of an architecture having a micro-frequency and macro-frequency plan, an architecture having only a single frequency plan may be provided. In particular, instead of an architecture having microscopic tessellation for communication with, for example, mobile devices and macroscopic tessellation for backhand communication, a single level of tessellation with a single set of frequencies may be provided.

Figure 7:
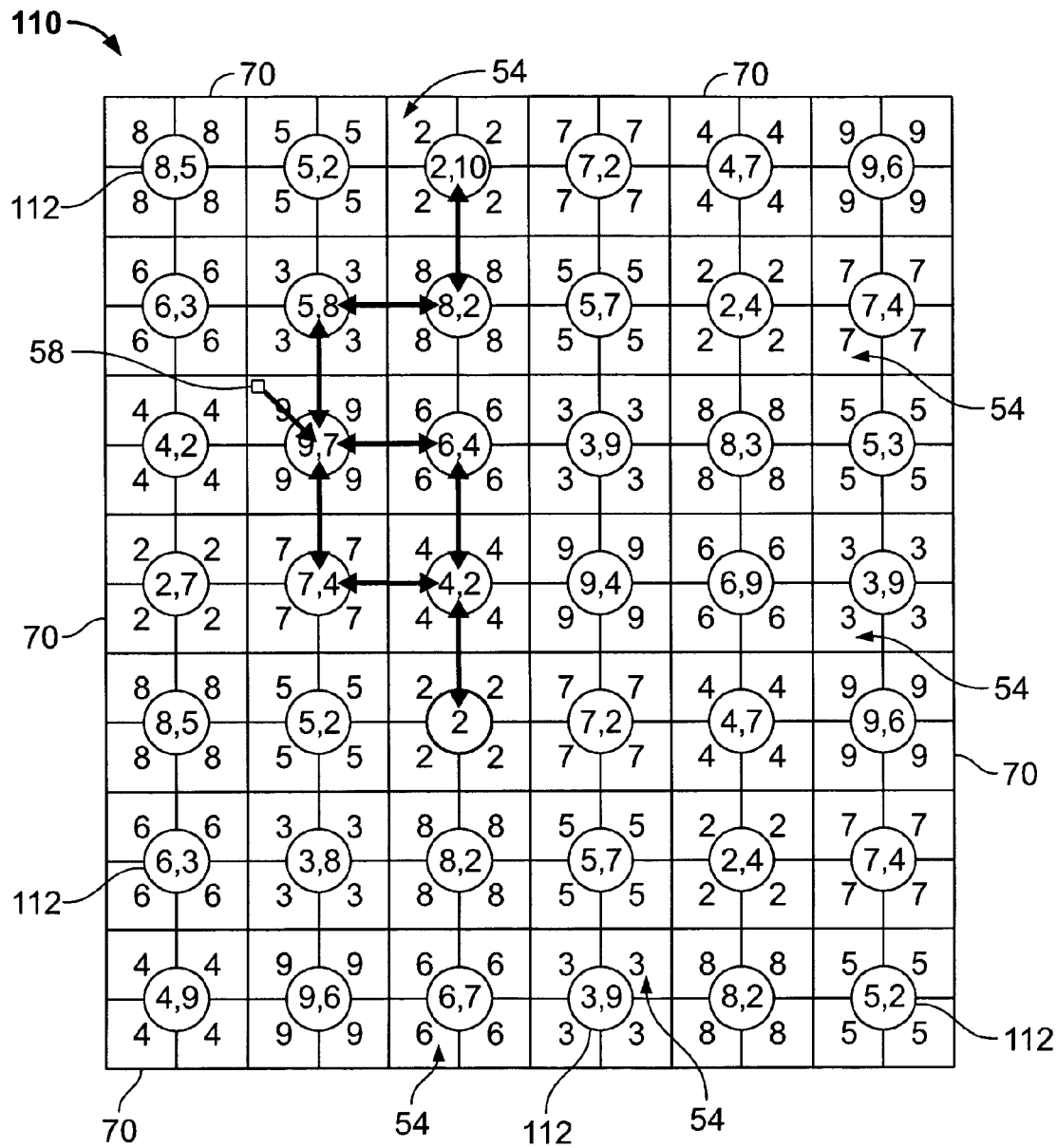
FIG. 7 is a block diagram of another backhaul macro-communication cell network including a plurality of communication cells in accordance with various embodiments of the invention.
Figure 8:
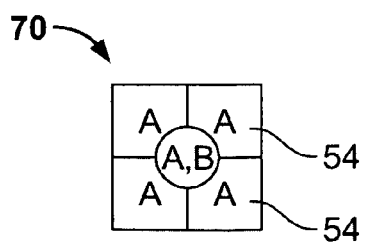
FIG. 8 is a block diagram of a single communication cell of the network shown in FIG. 7 in accordance with various embodiments of the invention.

Specifically, various embodiments of the present invention may provide a communication network with a plurality of communication cells and a communication scheme as shown in FIGS. 7 and 8. In general, these figures illustrate a communication network in which a time division duplex (TDD) air-link communication system may provide scheduled transmissions, for example, for out-bound and in-bound messages. A network architecture is thereby provided that can support a multi-hop mesh with high capacity and throughput. Specifically, and as shown in FIG. 7, a wireless network architecture 110 defines a frequency communication scheme or plan using a plurality of communication cells 70 configured having wireless access coverage areas 54 in a square pattern. The wireless network architecture 110 defines a multi-hop TDD network, which in one embodiment, includes eight frequencies available to the network, identified in FIG. 7 as frequencies 2 through 9. Each of the different frequencies may be configured or defined as desired or needed, and as described in more detail herein. Each of the communication cells 70 includes an access point 112, which in this embodiment is shown positioned in the center of each communication cell 70. Each access point 112 is configured to communicate on one of two frequencies (A, B) for example using the radios 56 as shown in FIG. 3.

Figure 9:
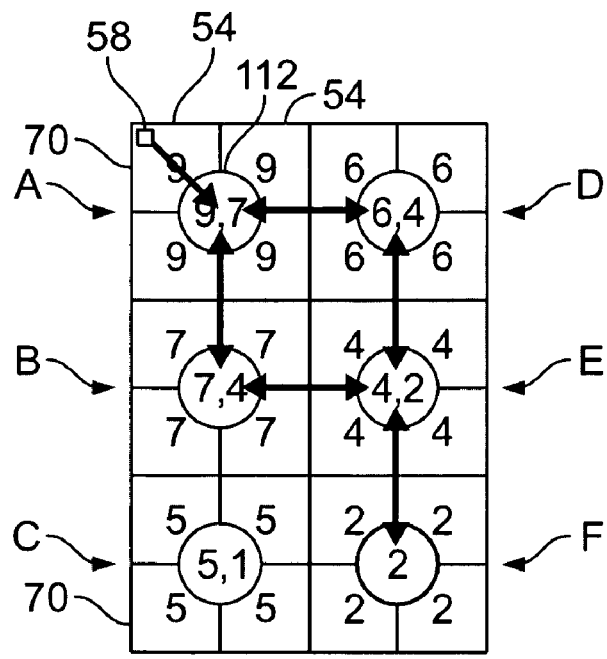
FIG. 9 is a block diagram illustrating an example of communication between a plurality of communication cells in a wireless communication network in accordance with various embodiments of the invention.

More particularly, and as shown in FIG. 8, a communication cell 70 includes or is defined by a plurality of wireless access coverage areas 54. In each of the communication cells 70, a first frequency (designated by A) is defined in one embodiment as a base station frequency that may be configured to provide an out-bound communication link, and that allows, for example, a base station having the radios 56, to communicate with a plurality of subscribers (e.g., mobile devices 58 within the wireless access coverage areas 54). Additionally, the first frequency also allows communication within an adjacent or neighboring communication cell 70, for example, when requesting transmission thereto. The second frequency (designated as B) is defined in one embodiment as a subscriber frequency that may be configured to provide an in-bound communication link, for example, between a base station in one communication cell 70 and a base station in another adjacent or neighboring communication cell 70 requesting communication therewith. For example, and as shown in FIG. 9, the communication cell 70 (identified by the letter A and referred to herein as communication cell A) is configured to communicate as a base-station on a first frequency (frequency 9) between the access point 112 associated with communication cell A and any subscriber, for example, mobile devices 58, within any of the wireless access coverage areas 54 within communication cell A. Additionally, communication cell A operates as a subscriber and communicates on a second frequency (frequency 7) with a second communication cell 70 identified as communication cell B, and that provides communication there between using the first frequency (e.g., base station frequency) of communication cell B. Further, and for example, the first frequency, as shown in communication cell E, may operate as a base-station frequency for communicating to an adjacent communication cell 70, in this embodiment, communication cell 70 identified as communication cell B, to communicate on the second or subscriber frequency (frequency 4).

Thus, each communication cell 70, communicates on a first frequency, for example, a base-station frequency between the access point 112 and any subscriber within the communication cell 70, as well as with an adjacent communication cell 70, and on a second frequency, for example, a subscriber frequency with another adjacent cell, wherein the communication cell is now a subscriber to the adjacent communication cell (e.g., adjacent communication cell requesting communication from the first communication cell).

Figure 10:
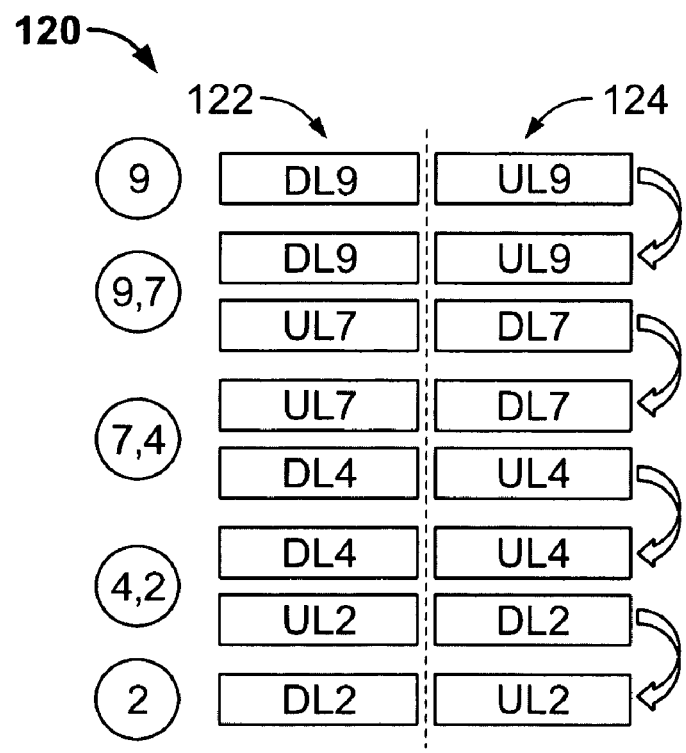
FIG. 10 is a block diagram illustrating a communication scheme for communicating in a wireless communication network in accordance with various embodiments of the invention.

With respect to communication between and within the communication cells 70, a TDD communication scheme or media access layer is provided as described herein. Specifically, the media-access layer for the two frequencies are coordinated such that the access points 112 will simultaneously transmit on both frequencies or receive on both frequencies, but will not transmit on one frequency and receive on the other frequency at the same time. In this manner, the access points 112 will avoid self-interference. An example of the coordinated transmission is shown in more detail in FIG. 10 wherein two adjacent communication cells 70 are communicating (e.g., two adjacent communication cells 70 and as shown in FIG. 9). For example, and as shown in FIG. 10, the TDD frame structure, which may be a media access control (MAC) frame structure 120 is divided into two sections 122 and 124, which may be defined as half frames. During communication, one section may be defined as (i) a downlink (DL) frame, for example, in which a base station transmits to a subscriber station and (ii) an uplink (UL) frame, for example, in which a subscriber transmits to a base station (or access point). In operation, and at a single access point 112 (shown in FIGS. 7 and 9), when one frequency is in a downlink communication mode the other frequency is in an uplink communication mode in order to avoid simultaneous transmit and receive. At adjacent communication cells 70, the order of downlink and uplink communication are reversed in order to allow the subscriber of one communication cell 70 to synchronize with the base station of the adjacent communication cell 70.

As shown in FIGS. 9 and 10, a message may hop from a mobile 58 (shown in communication cell A) to the access point 112 on frequency 9 and from the access point 112 in communication cell A to the access point 112 in communication cell B on frequency 7, then from the access point 112 in communication cell B to the access point 112 in communication cell E on frequency 4, and finally from the access point 112 in communication cell E to the access point 112 in communication cell F on frequency 2. As shown, communication cell F with a single frequency 2 is configured to have a wired backhaul connection to the network. Communication cell F only requires a single frequency as it only operates as a base station.

Thus, a single backhaul connection on the communication cell 70 with frequency 2 (as shown in FIGS. 7 and 9) can support, for example, twenty-five access points 112. Because the communication is on separate frequencies, and because the access points 112 are designed to avoid self-interference, messages can be communicated from access point to access point in adjacent communication cells 70 simultaneously without interference. Thus, the throughput of the wireless network architecture 110 does not decrease with each hop. In operation, the throughput is independent of the number of hops. Therefore, the wireless network architecture 110 provides a reduced backhaul cost advantage typically provided by mesh networks without the problems of reduced capacity and throughput. In general, the wireless network architecture 110 allows for dynamic routing of traffic through the network with each access point 112 choosing to send a message to one of a plurality, for example, four neighboring access points 112 in neighboring communication cells 70.

Thus, the wireless network architecture 110 can reduce or avoid congestion, node failures, etc. For example, and as shown in FIG. 7, the access point 112 identified by (9, 7) that receives a mobile message on frequency 9, may be controlled and switched to route the message using frequency 8 instead of frequency 7, as indicated by the dashed line in FIG. 7, and which would route the message to another communication cell 70 communicating on this frequency. In this manner, the message can be routed to another wired backhaul connection (not shown) in the wireless network architecture 110. Thus, the first and second frequencies are dynamically configurable, for example, based on one of an access point failure, bandwidth usage, communication traffic flow, and communication priority.

Also, it should be noted that communication within the various wireless network architectures as described herein may be provided using different modulation schemes within a communication protocol (e.g., IEEE 802.16), for example, using BPSK, QPSK, 16 QAM and/or 64 QAM modulation schemes with different error correction and coding as is known. Additionally, the protocol configuration for communicating within and between access points may be provided as is known, for example, using an IEEE 802.16 communication standard.

Thus, the wireless network architecture provided by the various embodiments of the present invention allows for (i) a reduced number of fixed wired connections to access points through the use of a wireless backhaul; (ii) dynamic allocation of bandwidth to provide outbound communication to subscribers and inbound communication back to the wired network using a single frequency band (iii) frequency planning to allocate frequencies among the network of access points to reduce or avoid interference among messages in the network; and (iv) use of the same frequency band for both mobile device to local access point communication and local access point to backhaul communication through an allocation of the sub-channels in the band among these functions.

Thus, simultaneous communication may be provided between (i) mobile devices and local access points, (ii) local access points and other local access points, and (iii) local access points and the network via master access points without interference using different frequencies as described herein.

While the invention has been described in terms of various specific embodiments, those skilled in the art will recognize that the invention can be practiced with modification within the spirit and scope of the claims.

What is claimed is:

1. A wireless communications network using a common wireless communications protocol including a media access layer having a media access control (MAC) frame structure comprising first and second MAC frame sections, the wireless communications network comprising:
   a plurality of communications cells configured to use the common wireless communications protocol and comprising at least first, second, and third communications cells;
   the first, second, and third communications cells comprising first, second, and third access points, respectively;
   the first access point being configured to communicate, using the common wireless communications protocol, on a first frequency, during the first MAC frame section, with a mobile device within a respective wireless communication coverage area of the first communications cell, the first access point also being configured to communicate, using the common wireless communications protocol, on the first frequency with the second access point;
   the third access point being configured to communicate, using the common wireless communications protocol, on a second frequency, during the second MAC frame section, with the first access point and a mobile device within a respective wireless communications coverage area of the third communications cell.

2. A wireless communication network in accordance with claim 1, wherein the MAC frame structure comprises a time division duplexing (TDD) frame structure; and wherein the first and second MAC frame sections comprise first and second half-frames of the TDD frame structure.

3. A wireless communication network in accordance with claim 1, wherein the first access point communicates outbound communications on the first frequency; and wherein the first access point receives inbound communications on the second frequency.

4. A wireless communication network in accordance with claim 1, wherein the first, second, and third access points are configured to dynamically configure the first and second frequencies based upon at least one of an access point failure, bandwidth usage, communication traffic flow, and communication priority.

5. A method of operating wireless communication network including a plurality of communications cells configured to use a common wireless communications protocol comprising at least first, second, and third communications cells, the first, second, and third communications cells comprising first, second, and third access points, respectively, the common wireless communications protocol including a media access layer having a media access control (MAC) frame structure comprising first and second MAC frame sections, the method comprising:
   configuring the first access point to communicate, using the common wireless communications protocol, on a first frequency during the first MAC frame section, and on a second frequency during the second MAC frame section, with at least one of a mobile device within a respective wireless communication coverage area of the first communications cell and the second access point;

configuring the third access point to communicate, using the common wireless communications protocol, on the first frequency during the first MAC frame section, and on the second frequency during the second MAC frame section, with the first access point and a mobile device within a respective wireless communications coverage area of the third communications cell.

6. A method in accordance with claim 5, wherein the MAC frame structure comprises a time division duplexing (TDD) frame structure; and wherein the first and second MAC frame sections comprise first and second half-frames of the TDD frame structure.

7. A method in accordance with claim 5, wherein the first access point is configured to communicate outbound communications on the first frequency; and wherein the first access point is configured to receive inbound communications on the second frequency.

8. A wireless communications network using a common wireless communications protocol including a media access layer having a media access control (MAC) frame structure with first and second MAC frame sections, the wireless communications network comprising:

a plurality of communications cells configured to use the common wireless communications protocol and comprising at least first, second, and third communications cells;

the first, second, and third communications cells comprising first, second, and third access points, respectively;

the first access point being configured to communicate, using the common wireless communications protocol, on a first frequency, during the first MAC frame section, with at least one of a mobile device within a respective wireless communication coverage area of the first communications cell and the second access point;

the third access point being configured to communicate, using the common wireless communications protocol, on a second frequency, during the second MAC frame section, with the first access point and a mobile device within a respective wireless communications coverage area of the third communications cell.

9. A wireless communication network in accordance with claim 8, wherein the MAC frame structure comprises a time division duplexing (TDD) frame structure; and wherein the first and second MAC frame sections comprise first and second half-frames of the TDD frame structure.

10. A method of operating wireless communication network including a plurality of communications cells configured to use a common wireless communications protocol including a media access layer having a media access control (MAC) frame structure with first and second MAC frame sections, the wireless communication network comprising at least first, second, and third communications cells, the first, second, and third communications cells comprising first, second, and third access points, respectively, the method comprising:

configuring the first access point to communicate, using the common wireless communications protocol, on a first frequency, during the first MAC frame section, with at least one of a mobile device within a respective wireless communication coverage area of the first communications cell and the second access point;

configuring the third access point to communicate, using the common wireless communications protocol, on a second frequency, during the second MAC frame section, with the first access point and a mobile device within a respective wireless communications coverage area of the third communications cell.

11. A method in accordance with claim 10, wherein the MAC frame structure comprises a time division duplexing (TDD) frame structure; and wherein the first and second MAC frame sections comprise first and second half-frames of the TDD frame structure.

* * * * *